United States Patent
Kim

(10) Patent No.: US 11,955,037 B2
(45) Date of Patent: Apr. 9, 2024

(54) DISPLAY APPARATUS FOR VEHICLE AND CONTROL METHOD THEREFOR

(71) Applicant: HYUNDAI MOBIS CO., LTD., Seoul (KR)

(72) Inventor: Shin Yeong Kim, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 349 days.

(21) Appl. No.: 17/525,824

(22) Filed: Nov. 12, 2021

(65) Prior Publication Data
US 2022/0198967 A1    Jun. 23, 2022

(30) Foreign Application Priority Data

Dec. 23, 2020 (KR) .................. 10-2020-0182523

(51) Int. Cl.
| | |
|---|---|
| *G09F 9/30* | (2006.01) |
| *B60K 37/02* | (2006.01) |
| *B60R 11/02* | (2006.01) |
| *B60K 35/00* | (2006.01) |

(52) U.S. Cl.
CPC .............. *G09F 9/301* (2013.01); *B60K 37/02* (2013.01); *B60R 11/0235* (2013.01); *B60K 35/00* (2013.01); *B60K 2370/1529* (2019.05); *B60K 2370/1533* (2019.05)

(58) Field of Classification Search
CPC . G09F 9/301; B60K 2370/1533; B60K 37/02; B60K 2370/1529; B60K 35/00; B60Q 3/10; B60R 11/0235
USPC ........................................................ 348/115
See application file for complete search history.

(56) References Cited

U.S. PATENT DOCUMENTS

| | | | |
|---|---|---|---|
| 2009/0051830 A1 | 2/2009 | Matsushita | |
| 2015/0029229 A1 | 1/2015 | Voutsas | |
| 2016/0193923 A1* | 7/2016 | Kim | B60R 11/0235 296/70 |
| 2017/0217290 A1* | 8/2017 | Yoshizumi | H04N 7/183 |
| 2017/0349098 A1* | 12/2017 | Uhm | G02B 27/0101 |

(Continued)

FOREIGN PATENT DOCUMENTS

| | | |
|---|---|---|
| KR | 10-1924059 | 2/2019 |
| KR | 2019-0079241 | 7/2019 |
| WO | WO 2007/077649 | 7/2007 |

OTHER PUBLICATIONS

English Language Abstract of WO 2007/077649 published Jul. 12, 2007.

*Primary Examiner* — Frantz B Jean
(74) *Attorney, Agent, or Firm* — DLA Piper LLP (US)

(57) ABSTRACT

A display apparatus for a vehicle comprising: a display panel configured to display an image on one surface and to be rolled around a shaft; a shaft driving unit configured to rotate the shaft; an image processing unit configured to determine a size and a position of an image, which is to be displayed by the display panel, based on input image information; an image output unit configured to output the image to the display panel according to the size and position of the image determined by the image processing unit; and a driving control unit configured to control the shaft driving unit to adjust an amount of exposure of the display panel according to the size and position of the image o be displayed by the display panel so that an image blank is not generated on the display panel.

13 Claims, 7 Drawing Sheets

(56) References Cited

U.S. PATENT DOCUMENTS

2019/0197960 A1\* 6/2019 Kim ............... G09G 3/035
2020/0323087 A1\* 10/2020 Hwang ............ H05K 5/0247

\* cited by examiner (a)

(b)

(c)

DISPLAY APPARATUS FOR VEHICLE AND CONTROL METHOD THEREFOR

CROSS-REFERENCE TO RELATED APPLICATION

This application claims priority to and the benefit of Korean Patent Application No. 10-2020-0182523, filed on Dec. 23, 2020, the disclosure of which is incorporated herein by reference in its entirety.

BACKGROUND

Field of the Invention

The present disclosure relates to a display apparatus for a vehicle and a control method therefor. More specifically, the present disclosure relates to a display apparatus for a vehicle using a rollable display and a control method therefor.

Discussion of Related Art

The contents described here provide only background information for the present disclosure and do not constitute the related art.

A display apparatus capable of providing various pieces of information is installed around a driver's seat, for example, a center fascia or dashboard, of a vehicle. Such a display apparatus provides information about a route from an origin to a destination, a present location of a vehicle, and the like. In addition, the display apparatus may play music or videos, receive a terrestrial broadcast or satellite broadcast to display contents thereof on a screen, provide pieces of information, such as a state of the vehicle, weather, and news, for user convenience, and serve as navigation.

Meanwhile, a display apparatus, such as a television (TV) and a screen of a mobile phone, may also be formed using a flexible display, for example, a rollable display. In such a display apparatus, since a display panel may be bent or folded like paper, a size or angle of an area in which an image is displayed may be freely adjusted.

In most display apparatuses installed in vehicles, a display panel is configured to be retractable into a center fascia or dashboard of a vehicle when not operating and withdrawable to the outside when operating.

In a case in which the display panel protrudes externally, the display panel may partially obscure a driver's driving view. In addition, since the entirety of a screen protrudes externally regardless of a kind of image which is to be displayed, when a ratio and a size of the image do not match a ratio and a size of the screen, a black area may be transmitted on the screen, which may be a factor that hinders an immersion degree of a passenger in viewing the image.

SUMMARY OF THE INVENTION

The present disclosure is mainly directed to providing a display apparatus for a vehicle capable of securing a driving view of a driver and providing a sense of immersion in viewing to a passenger of a vehicle by automatically adjusting a height of an exposed display area using a rollable display, and a control method therefor.

According to at least one embodiment, the present disclosure provides a display apparatus for a vehicle comprising: a display panel configured to display an image on one surface and to be rolled around a shaft; a shaft driving unit connected to the shaft and configured to rotate the shaft; an image processing unit configured to determine a size and a position of an image, to be displayed by the display panel based on input image information; an image output unit configured to output the image to the display panel according to the size and position of the image determined by the image processing unit; and a driving control unit configured to control the shaft driving unit to adjust an amount of exposure of the display panel according to the size and position of the image to be displayed by the display panel so that an image blank is not generated on an upper end or lower end of the display panel.

According to at least another embodiment, the present disclosure provides a control method for a display apparatus for a vehicle, comprising: determining a size and a position of an image, to be displayed by a display panel based on image information input to the display panel that is configured to display the image on one surface; exposing the display panel rolled around a shaft by rotating the shaft by a shaft driving unit connected to the shaft; adjusting an amount of exposure of the display panel according to the size and position of the image, to be displayed by the display panel, by controlling the shaft driving unit; and outputting the image so that an image blank is not generated on an upper end or lower end of the display panel.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

Figure 1:
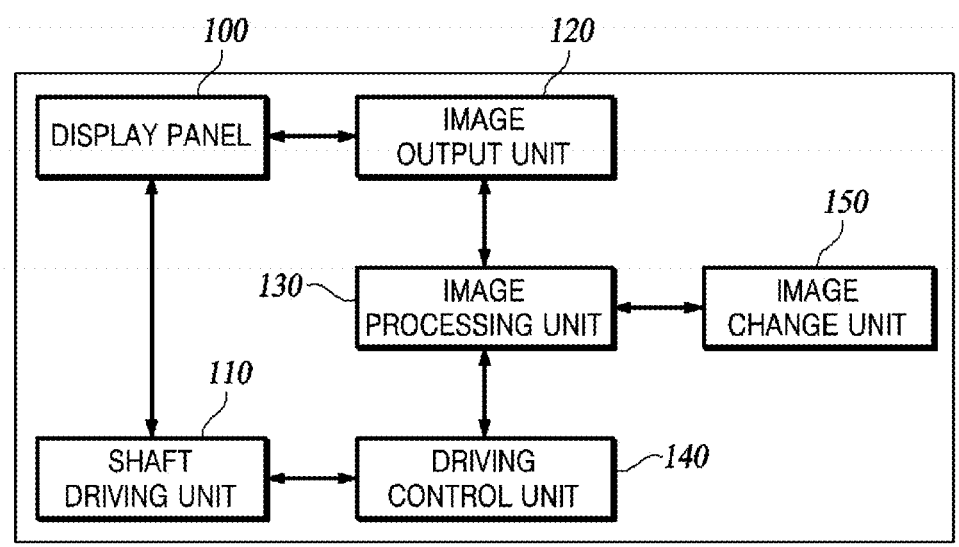
FIG. 1 is a block diagram of a display apparatus for a vehicle according to one embodiment of the present disclosure.

| REFERNCE NUMERICALS | |
|---|---|
| 10: display apparatus | 100: a display panel |
| 110: shaft driving unit | 120: image output unit |
| 130: image processing unit | 140: driving control unit |
| 150: image change unit | |

DETAILED DESCRIPTION OF EXEMPLARY EMBODIMENTS

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a block diagram of a display apparatus for a vehicle according to one embodiment of the present disclosure.

Figure 2:
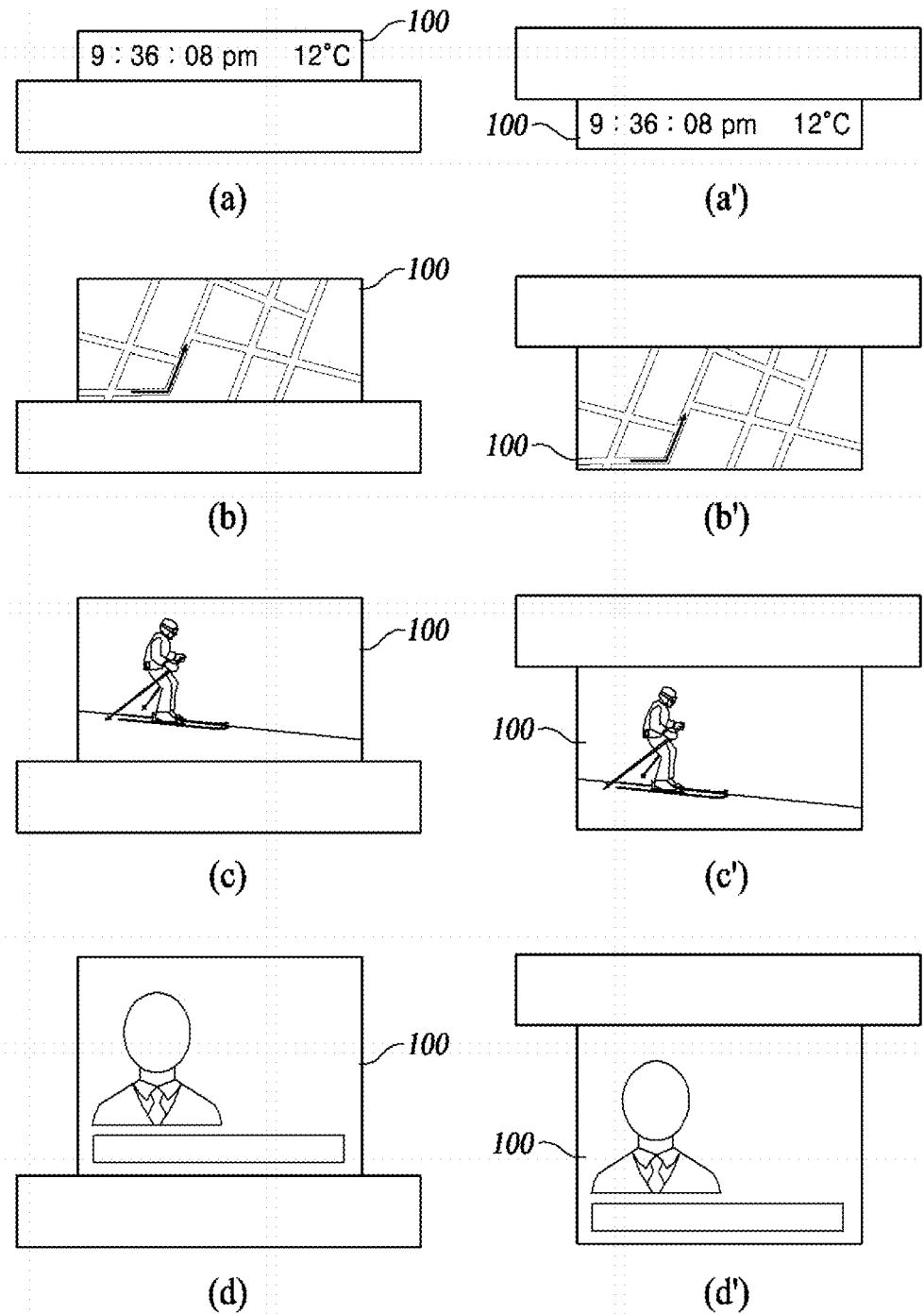
FIG. 2 shows views (a)—(d') illustrating examples in which the display apparatus for a vehicle according to one embodiment of the present disclosure displays images.

FIG. 2 shows views (a)-(d') illustrating examples in which the display apparatus for a vehicle according to one embodiment of the present disclosure displays images.

Referring to FIGS. 1 and 2, a display apparatus 10 for a vehicle according to one embodiment of the present disclosure includes all or some of a display panel 100, a shaft driving unit 110, an image processing unit 130, an image output unit 120, a driving control unit 140, and an image change unit 150.

The display panel 100 is configured to display an image on one surface thereof. The display panel 100 may be configured using an element such as a liquid crystal display (LCD) and an organic light emitting diode (OLED) but is not necessarily limited thereto.

One or more support bars (not shown) may be disposed on the other surface of the display panel 100. This is to prevent the display panel 100 from moving in the direction of gravity due to a weight of the display panel 100 when the display panel 100 is exposed. Meanwhile, each of the support bars may include a hinge unit (not shown), and when the hinge unit is used, the support bar may be folded according to an amount of exposure of the display panel 100.

In addition, the display panel 100 is configured to be rolled around a shaft (not shown) as a central axis. Accordingly, the display panel 100 may be formed of a flexible material, and an extent in which the display panel 100 is exposed may vary according to an extent in which the display panel 100 is rolled around the shaft.

As illustrated in FIG. 2, different images may be displayed according to an amount of exposure of the display panel 100, and the display panel 100 may be exposed above or below the shaft. Hereinafter, a case in which the display panel 100 is exposed above the shaft will be described as a roll-up display, and a case in which the display panel 100 is exposed below the shaft will be described as a roll-down display.

In addition, by using the features described above, the display panel 100 may be configured to be retracted into a center fascia, a dashboard, an A-pillar, a B-pillar, a sun visor, an overhead console, a console box, a head lining, a driver's seat, a passenger's seat, or the like of the vehicle, and may also be withdrawn to the outside.

Meanwhile, hereinafter, an amount of exposure of the display panel 100 as in views (a) and (a') of FIG. 2 is defined and will be described as stage one, an amount of exposure of the display panel 100 as in views (b) and (b') of FIG. 2 is defined and will be described as stage two, an amount of exposure of the display panel 100 as in views (c) and (c') of FIG. 2 is defined and will be described as stage three, and an amount of exposure of the display panel 100 as in views (d) and (d') of FIG. 2 is defined and will be described as stage four. However, such definitions are for dividing and describing stages according to the amount of exposure of the display panel 100, the stages do not need to be necessarily divided into four stages, and the number of stages and the amount of exposure for each stage may be changed according to a display objective, display content, an environment, and the like.

The shaft driving unit 110 is connected to the shaft to rotate the shaft. According to a direction in which the shaft driving unit 110 rotates, the display panel 100 may be drawn in and out, and according to an amount of rotation of the shaft, an amount of exposure of the display panel 100 may be adjusted. Meanwhile, a speed at which the shaft driving unit 110 rotates the shaft may be constant but is not necessarily limited thereto.

The image processing unit 130 is configured to determine a size and a position of an image which is to be displayed by the display panel 100 on the basis of input image information. For example, the image processing unit 130 may reduce or enlarge a size of an input image according to a size of the display panel 100 and determine a position at which the image is displayed on the display panel 100 on the basis of an aspect ratio of the input image. In this case, the aspect ratio is referred to as a value of (horizontal length)/(vertical length) and may be expressed as, for example, 1.778 (16/9) or 1.333 (4/3).

Meanwhile, the image which is displayed by the display panel 100 may be input by a passenger of a vehicle or may also be automatically changed and input according to a driving state of the vehicle.

The image output unit 120 is configured to output an image to the display panel 100 according to the size and position of the image determined by the image processing unit 130. Accordingly, a user of the display apparatus 10 for a vehicle according to one embodiment of the present disclosure may watch the image according to the size and position determined by the image processing unit 130.

The driving control unit 140 controls the shaft driving unit 110. Accordingly, the driving control unit 140 may control an amount of rotation, a rotation direction, a rotation speed, and the like of the shaft. As the driving control unit 140 controls the shaft driving unit 110, and the shaft driving unit 110 adjusts the amount of exposure of the display panel 100 according to the size and position of the image which is to be displayed by the display panel 100, an image blank may not be generated on an upper end or lower end of the display panel 100.

That is, as illustrated in FIG. 2, the amount of exposure of the display panel 100 may be adjusted by control of the driving control unit 140, and thus the image blank is not generated on the upper end or lower end of the display panel 100. The image blank denotes a black area generated on an upper or lower end of a screen because an aspect ratio of the image does not match an aspect ratio of the display panel 100 and is also be referred to as a letterbox. Since the image blank is a major factor of lowering a sense of immersion in watching the image for viewers, it is preferable that the image blank is removed. The display apparatus 10 for a vehicle according to one embodiment of the present disclosure can provide an improved sense of immersion to a viewer by minimizing the image blank.

The image change unit 150 is configured to change the image, which is to be displayed by the display panel 100, according to a change in driving state of the vehicle. Accordingly, the image which is to be displayed by the display panel 100 may be changed according to the driving state of the vehicle. To this end, the image change unit 150 may operate in conjunction with an electronic control unit (ECU) of the vehicle.

In addition, even in a case in which the passenger arbitrarily changes an image, the image change unit 150 may change an input image. In this case, the image processing unit 130 may determine a size and a position of the changed image, and thus the image desired by the passenger may also be displayed on the display panel 100 without an image blank.

Figure 3:
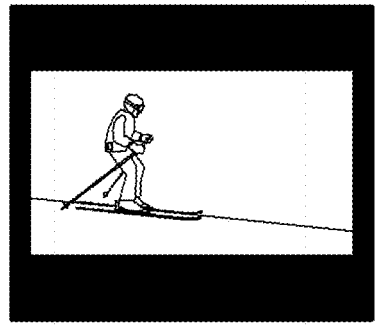
FIG. 3 shows views (a)-(c) for describing a position at which the display apparatus for a vehicle according to one embodiment of the present disclosure displays an image.
Figure 3:
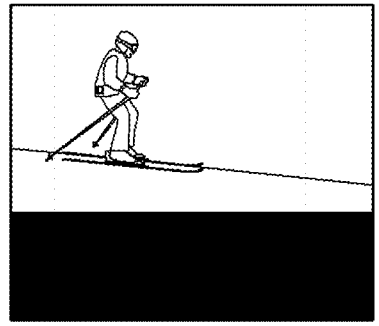
Figure 3:
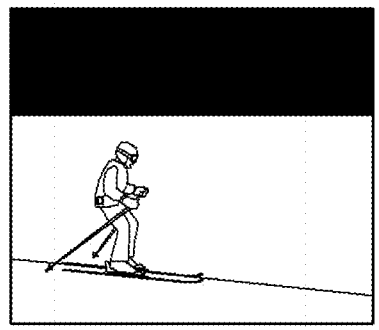

FIG. 3 shows views (a)-(c) for describing a position at which the display apparatus for a vehicle according to one embodiment of the present disclosure displays an image.

Figure 4:
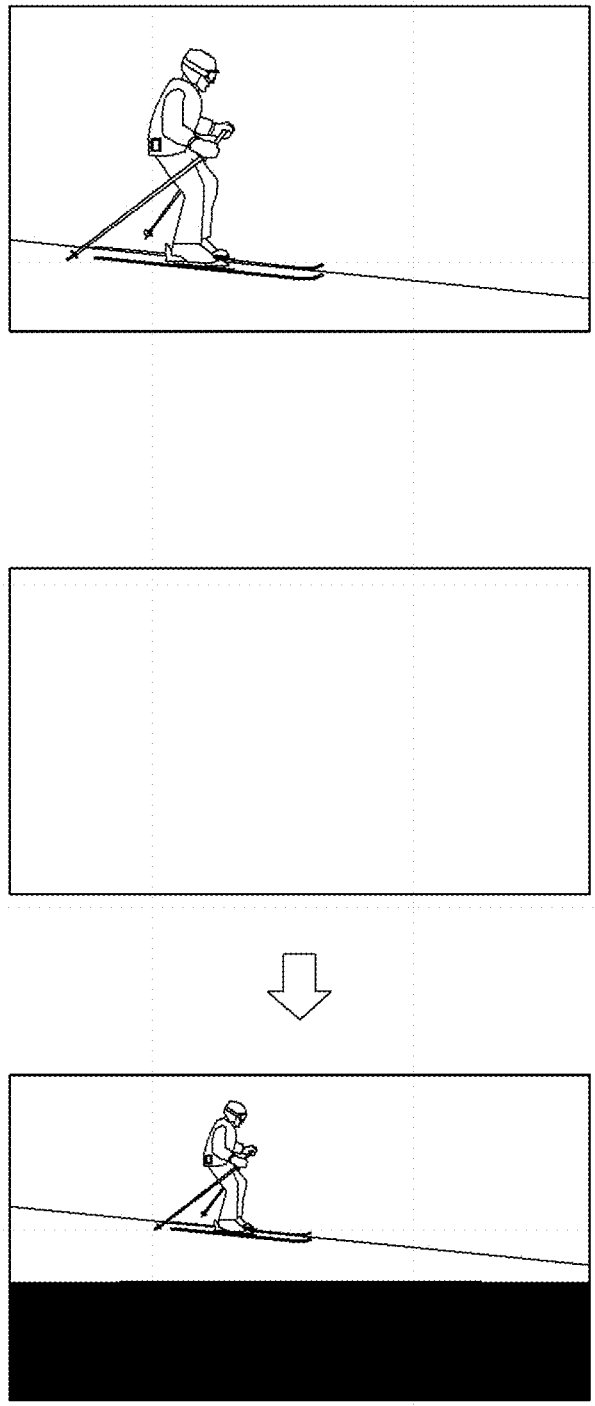
FIG. 4 is a view showing a process in which the display apparatus for a vehicle according to one embodiment of the present disclosure calculates a size and a position of an image having a high aspect ratio.

FIG. 4 is a view showing a process in which the display apparatus for a vehicle according to one embodiment of the present disclosure calculates a size and a position of an image having a high aspect ratio.

Figure 5:
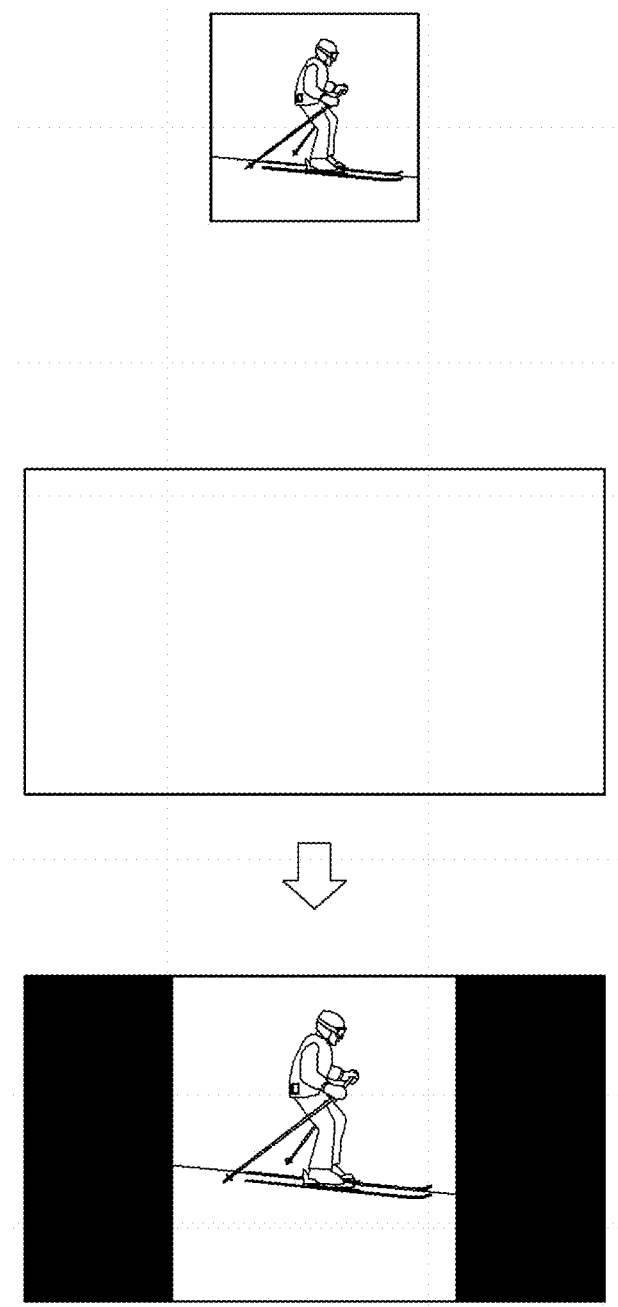
FIG. 5 is a view showing a process in which the display apparatus for a vehicle according to one embodiment of the present disclosure calculates a size and a position of an image having a low aspect ratio.

FIG. 5 is a view showing a process in which the display apparatus for a vehicle according to one embodiment of the present disclosure calculates a size and a position of an image having a low aspect ratio.

Referring to FIG. 3, view (a) shows a state in which a size and a position of an input image are not determined by the image processing unit 130. In this case, the viewer watches an image having an image blank regardless of an amount of exposure of the display panel 100, and this may lower a sense of immersion of the viewer.

View (b) of FIG. 3 shows a state in which a size and a position of an input image are determined by the image processing unit 130 in the case of the roll-up display. In this case, by exposing the display panel 100 at an upper portion until just before the image blank is generated, the viewer may watch an image which does not have the image blank.

View (c) of FIG. 3 shows a state in which a size and a position of an input image are determined by the image processing unit 130 in the case of the roll-down display. In this case, by exposing the display panel 100 at a lower portion until just before an image blank is generated, the viewer may watch an image which does not have the image blank.

Referring to FIG. 4, when an aspect ratio of an input image is higher than a maximum aspect ratio of the display panel 100, the image processing unit 130 may determine a size and a position of an image so that the image may be displayed from an upper end or lower end of the display panel 100 in accordance with the horizontal length of the display panel 100.

For example, when the aspect ratio of an image is about 1.778, and the maximum aspect ratio of the display panel 100 is 1.333, a position of an image may be determined so that the image is displayed from the upper end of the display panel 100. However, since FIG. 4 shows the case of the roll-up display, in the case of the roll-down display, a position of an image may be determined so that the image is displayed from the lower end of the display panel 100.

In addition, when an image is large and exceeds the screen of the display panel 100, that is, when a horizontal or vertical length of an image is greater than the horizontal or vertical length of the display panel 100, the image processing unit 130 may determine to reduce a size of an image while maintaining the aspect ratio of the image. For example, as in FIG. 4, when a horizontal length of an input image is greater than the horizontal length of the display panel 100, it may be determined to reduce a size of the image to match a maximum horizontal length of the display panel 100.

Referring to FIG. 5, when an aspect ratio of an input image is lower than the maximum aspect ratio of the display panel 100, the image processing unit 130 may determine a size and a position of an image so that the image is displayed at the aspect ratio of the input image in accordance with the vertical length of the display panel 100.

For example, when an aspect ratio of an image is about 1:1, and the maximum aspect ratio of the display panel 100 is 1.333, a position of an image may be determined to be displayed in a central area of the display panel 100.

In addition, when a size of an image is small, and an image blank is generated at all of upper, lower, left, and right sides of the screen of the display panel 100, that is, when horizontal and vertical lengths of an image are smaller than the horizontal and vertical lengths of the display panel 100, the image processing unit 130 may determine to increase a size of the image while maintaining the aspect ratio of the image. For example, as in FIG. 5, in a case in which horizontal and vertical lengths of an input image are smaller than the horizontal and vertical lengths of the display panel 100, it may be determined to increase the size of the image to match the vertical length of the display panel 100.

The display apparatus 10 for a vehicle according to one embodiment of the present disclosure can provide an improved sense of immersion to the viewer by minimizing an image blank in the above-described method.

Figure 6:
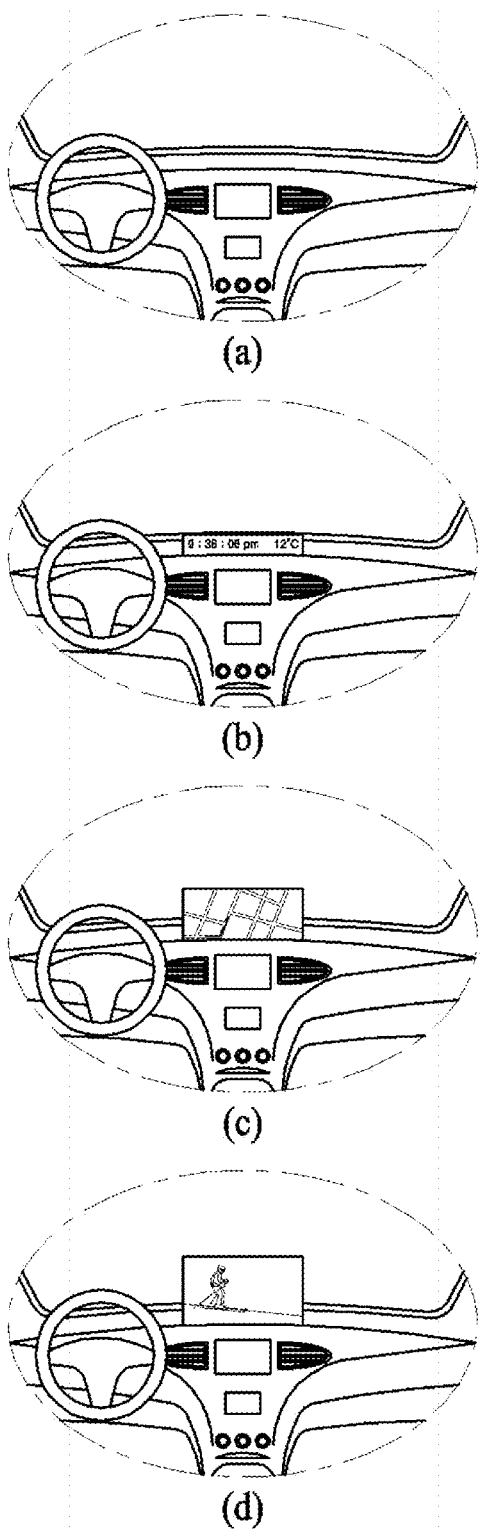
FIG. 6 shows views (a)-(d) illustrating examples in which the display apparatus for a vehicle according to one embodiment of the present disclosure is installed and operated in a vehicle.

FIG. 6 shows views (a)-(d) illustrating examples in which the display apparatus for a vehicle according to one embodiment of the present disclosure is installed and operated in a vehicle.

Referring to FIG. 6, the display apparatus 10 for a vehicle according to one embodiment of the present disclosure may be configured so that the image, which is to be displayed by the display panel 100, is changed according to a driving state of the vehicle, and the amount of exposure of the display panel 100 is adjusted to match the changed image.

For example, when an engine of the vehicle is turned off, the display panel 100 may not display an image and thus may not be exposed to the outside. When the engine of the vehicle is turned on, the display panel 100 may display basic information such as the current time and weather and thus may be exposed to the outside as much as stage one.

When navigation operates in a state in which the vehicle is being driven, the display panel 100 may display navigation information and thus may be exposed to the outside as much as stage two.

In addition, when an image is input in a state in which the vehicle is parked or being charged, the display panel 100 may display the input image and thus may be exposed to the outside as much as stage three or stage four.

More specifically, view (a) of FIG. 6 shows a case in which a power source of the display panel 100 is turned off, and in this case, the display panel 100 may be configured to be retracted into the dashboard of the vehicle. Meanwhile, the power source of the display panel 100 may be configured to be turned off at the same time when the engine of the vehicle is turned off and turned on at the same time when the engine of the vehicle is turned on, but the power source of the display panel 100 is not necessarily limited thereto. For example, even when the engine of the vehicle is turned off, the display panel 100 may be configured to display an image using a separate battery included in the vehicle. In this case, it is preferable that the power source of the display is turned off when a preset time elapses.

In addition, view (a) of FIG. 6 may also show a case in which an impact to the vehicle is detected. For example, the driving control unit 140 may operate in conjunction with a collision detection unit (not shown) included in the vehicle. When the collision detection unit detects an impact being applied to the vehicle, the display panel 100 may be configured to be retracted into the dashboard. This is to minimize damage of the display panel 100 and protect a passenger at the same time. When the driving control unit 140 controls the shaft driving unit 110 due to the impact to the vehicle, the driving control unit 140 may control the shaft to rotate at a speed higher than a speed thereof in a general situation.

View (b) of FIG. 6 shows a case in which the power source of the display panel 100 is turned on, and the amount of exposure of the display panel 100 is stage one. In this case, the display panel 100 may be configured to display basic information such as the current time and weather. For example, when the engine of the vehicle is turned on, the display panel 100 may be exposed from an inner portion of the dashboard to display the basic information described above.

View (c) of FIG. 6 shows a state in which the amount of exposure of the display panel 100 is stage two. In this case, the display panel 100 may be configured to display navigation information. That is, when the driver or passenger operates the navigation of the vehicle, the display panel 100 may display the navigation information so that the display panel 100 is exposed as much as stage two to guide a route. As described above, since the display panel 100 is configured to be exposed as much as an extent sufficient to display the navigation information, a problem such as hindering a driving view of the driver, which may occur when the entirety of the display panel 100 is exposed, can be prevented.

View (d) of FIG. 6 shows a state in which the amount of exposure of the display panel 100 is stage three. In this case, the display panel 100 may be configured to display infotainment information such as a movie, a television (TV) program, and a game. That is, when an image that the driver or passenger wants to watch is input in a state in which the vehicle is parked or being charged, the display panel 100 may be exposed as much as stage three and may display the image. However, the amount of exposure may be changed according to a size and an aspect ratio of the input image.

Meanwhile, in FIG. 6, the examples in which the display apparatus according to one embodiment of the present disclosure is configured to be retracted into the dashboard of the vehicle are illustrated, but a position into which the display apparatus is retracted is not necessarily limited to the inner portion of the dashboard. For example, the display panel 100 may also be configured to be retracted into a center fascia, an A-pillar, a B-pillar, a sun visor, an overhead console, a console box, a head lining, a driver's seat, or a passenger's seat of the vehicle.

In addition, in FIG. 6, it is illustrated that the basic information, the navigation information, and the infotainment information are displayed according to the amount of exposure of the display panel 100, but information displayed according to the amount of exposure is not necessarily limited thereto. For example, even when the display panel 100 is exposed in a state of stage two, the basic information may be displayed, and whether any image is displayed according to the amount of exposure may be changed according to the preference of a passenger.

Figure 7:
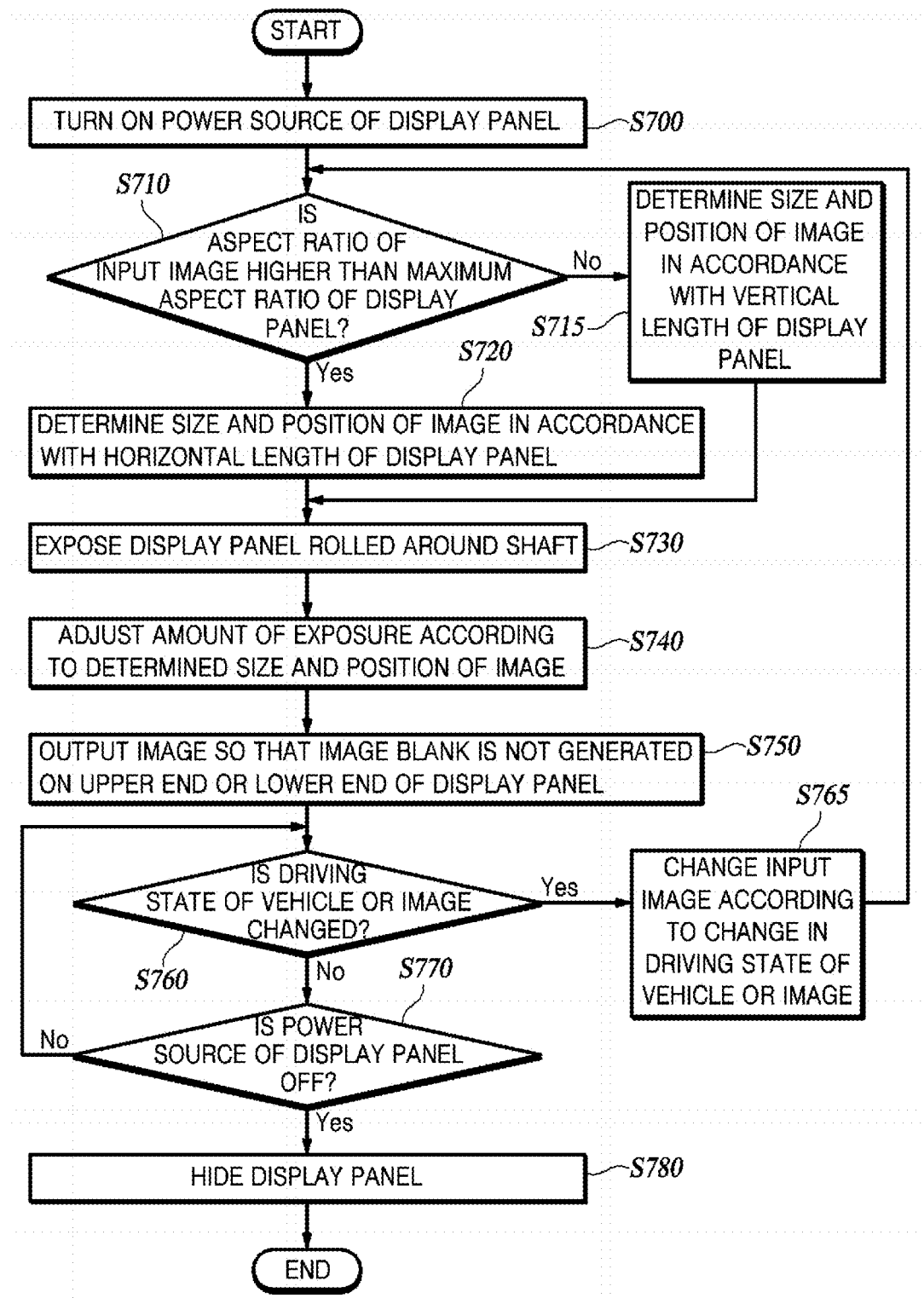
FIG. 7 is a flowchart illustrating a control method for the display apparatus for a vehicle according to one embodiment of the present disclosure.

FIG. 7 is a flowchart illustrating a control method for the display apparatus for a vehicle according to one embodiment of the present disclosure.

Referring to FIG. 7, in a control method for the display apparatus for a vehicle according to one embodiment of the present disclosure, when the power source of the display panel 100 is turned on (S700), it is determined whether an aspect ratio of an input image is higher than the maximum aspect ratio of the display panel 100 (S710). On the basis of this, a size and a position of an image, which will be displayed by the display panel 100, may be determined.

Meanwhile, the above determination may be performed by the image processing unit 130, and when the aspect ratio of the input image is lower than the maximum aspect ratio of the display panel 100, the image processing unit 130 determines the size and position of the image in accordance with the vertical length of the display panel 100 (S715). In this case, the input image may be displayed from the upper end or lower end of the display panel 100.

Conversely, when the aspect ratio of the input image is higher than the maximum aspect ratio of the display panel 100, the image processing unit 130 determines a size and a position of an image in accordance with the horizontal length of the display panel 100 (S720). In this case, the image may be displayed according to the aspect ratio of the input image, and a position of the image may be a central area of the display panel 100.

The shaft driving unit 110 connected to the shaft rotates the shaft so that the display panel 100 rolled around the shaft is exposed (S730), and in this case, the amount of exposure may be adjusted according to the determined size and position of the image (S740). The adjustment of the amount of exposure of the display panel 100 may be performed by the driving control unit 140 configured to control the shaft driving unit 110. Meanwhile, an exposure process of the display panel 100 does not need to be necessarily performed after the size and position of the image are determined, and the exposure process of the display panel 100 and the determination may be performed at the same time.

The image may be displayed so that an image blank is not generated on the upper end or lower end of the display panel 100 (S750), and this may be performed by the image output unit 120. Accordingly, through the control method for the display apparatus for a vehicle according to one embodiment of the present disclosure, the user may watch an image in which the image blank is minimized.

Meanwhile, while the display panel 100 displays the image, whether a driving state of the vehicle or the image is changed is determined (S760). Such determination may be performed by the image change unit 150, and when the driving state of the vehicle or the image is changed, the image change unit 150 changes the input image according to a change in driving state of the vehicle or image (S765). When the input image is changed, whether the aspect ratio of the image is higher than the maximum aspect ratio of the display panel 100 is determined (S710). On the basis of this, the size and position of the image, which is to be displayed by the display panel, may be determined. Then, the above-described processes are repeated.

When the driving state of the vehicle or the image is not changed, whether the power source of the display panel 100 is turned off is determined (S770). When the power source of the display panel 100 is not turned off, whether the driving state of the vehicle or the image is changed is continuously determined (S760). When the power source of the display panel 100 is turned off, the driving control unit 140 controls the shaft driving unit 110 to hide the display panel 100 (S780). In this case, the display panel 100 may be retracted into a center fascia, a dashboard, an A-pillar, a B-pillar, a sun visor, an overhead console, a console box, a head lining, a driver's seat, a passenger's seat, or the like of the vehicle.

In addition, although not illustrated in FIG. 7, in the control method for the display apparatus for a vehicle according to one embodiment of the present disclosure, when the collision detection unit included in the vehicle detects an impact being applied to the vehicle, the display panel 100 may be retracted into and hidden by a center fascia, a dashboard, an A-pillar, a B-pillar, a sun visor, an overhead console, a console box, a head lining, a driver's seat, a passenger's seat, or the like of the vehicle.

According to one embodiment to the present disclosure described above, a driving view of a driver can be secured, and a sense of immersion in viewing can be provided to a passenger by automatically adjusting a height to which a display area is exposed using a rollable display.

According to the present embodiment described above, there are effects of securing a driving view of a driver and providing a sense of immersion in viewing to a passenger by automatically adjusting a height of an exposed display area using a rollable display.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A display apparatus for a vehicle comprising:
a display panel configured to display an image on one surface and to be rolled around a shaft;
a shaft driving unit connected to the shaft and configured to rotate the shaft;
an image processing unit configured to determine a size and a position of an image to be displayed by the display panel based on input image information;
an image output unit configured to output the image to the display panel according to the size and position of the image determined by the image processing unit; and
a driving control unit configured to control the shaft driving unit to adjust an amount of exposure of the display panel according to the size and position of the image to be displayed by the display panel so that an image blank is not generated on an upper end or lower end of the display panel.

2. The display apparatus of claim 1, wherein, when an aspect ratio of an input image is higher than a maximum aspect ratio of the display panel, the image processing unit determines the size and position of the image so that the image is displayed from the upper end or lower end of the display panel in accordance with a horizontal length of the display panel.

3. The display apparatus of claim 1, wherein, when an aspect ratio of an input image is lower than a maximum aspect ratio of the display panel, the image processing unit determines the size and position of the image so that the image is displayed at the aspect ratio of the input image in accordance with a vertical length of the display panel.

4. The display apparatus of claim 1, wherein:
the image to be displayed by the display panel is changed according to a driving state of a vehicle; and
the amount of exposure of the display panel is adjusted in accordance with the changed image.

5. The display apparatus of claim 1, wherein, when a power source is turned off, the display panel is configured to be retracted into a center fascia, a dashboard, an A-pillar, B-pillar, a sun visor, an overhead console, a console box, a head lining, a driver's seat, or a passenger's seat of a vehicle.

6. The display apparatus of claim 1, wherein, when a collision detection unit included in a vehicle detects an impact being applied to the vehicle, the display panel is retracted into a center fascia, a dashboard, an A-pillar, a B-pillar, a sun visor, an overhead console, a console box, a head lining, a driver's seat, or a passenger's seat of the vehicle by the driving control unit which operates in conjunction with the collision detection unit.

7. The display apparatus of claim 1, wherein the display panel is exposable above or below the shaft.

8. A control method for a display apparatus for a vehicle, comprising:
determining a size and a position of an image to be displayed by a display panel based on image information input to the display panel that is configured to display the image on one surface;
exposing the display panel rolled around a shaft by rotating the shaft by a shaft driving unit connected to the shaft;
adjusting an amount of exposure of the display panel according to the size and position of the image to be displayed by the display panel by controlling the shaft driving unit; and
outputting the image so that an image blank is not generated on an upper end or lower end of the display panel.

9. The control method of claim 8, wherein the determining of the size and position of the image to be displayed by the display panel includes determining the size and position of the image so that the image is displayed from the upper end or lower end of the display panel in accordance with a horizontal length of the display panel when an aspect ratio of an input image is higher than a maximum aspect ratio of the display panel.

10. The control method of claim 8, wherein the determining of the size and position of the image to be displayed by the display panel includes determining the size and position of the image so that the image is displayed at an aspect ratio of an input image in accordance with a vertical length of the display panel when the aspect ratio of the input image is lower than a maximum aspect ratio of the display panel.

11. The control method of claim 8, further comprising:
after the outputting of the image so that the image blank is not generated on the upper end or lower end of the display panel,
changing the image to be displayed by the display panel according to a driving state of a vehicle;
determining a size and a position of the image to be displayed by the display panel based on changed image information; and
adjusting the amount of exposure of the display panel according to the size and position of the image to be displayed by the display panel by controlling the shaft driving unit.

12. The control method of claim 8, further comprising, when a power source of the display panel is turned off, hiding the display panel by retracting the display panel into a center fascia, a dashboard, an A-pillar, a B-pillar, a sun visor, an overhead console, a console box, a head lining, a driver's seat, or a passenger's seat of a vehicle after the outputting of the image so that the image blank is not generated on the upper end or lower end of the display panel.

13. The control method of claim 8, further comprising, when a collision detection unit included in a vehicle detects an impact being applied to the vehicle, hiding the display panel by retracting the display panel into a center fascia, a dashboard, an A-pillar, a B-pillar, a sun visor, an overhead console, a console box, a head lining, a driver's seat, or a passenger's seat of the vehicle after the outputting of the image so that the image blank is not generated on the upper end or lower end of the display panel.

* * * * *